United States Patent [19]
Berg

[11] 4,082,414
[45] Apr. 4, 1978

[54] HEAT RECUPERATION

[75] Inventor: Charles A. Berg, Buckfield, Maine

[73] Assignee: Pyreflex Corporation, Sudbury, Mass.

[21] Appl. No.: 663,370

[22] Filed: Mar. 3, 1976

[51] Int. Cl.² .................. G02B 13/14; G02B 5/124
[52] U.S. Cl. .................................. 350/1.7; 350/67; 350/103
[58] Field of Search ............... 356/4, 5; 350/102, 103, 350/1, 109, 292, 299, 179, 61, 66, 67, 202

[56] References Cited
U.S. PATENT DOCUMENTS

| | | | |
|---|---|---|---|
| 2,012,933 | 8/1935 | Davidson | 350/102 |
| 2,320,504 | 6/1943 | Bailey | 350/67 |
| 2,854,349 | 9/1958 | Dreyfus et al. | 350/1 X |
| 2,930,893 | 3/1960 | Carpenter et al. | 350/102 X |
| 3,215,039 | 11/1965 | Gill, Jr. | 350/109 X |
| 3,229,682 | 1/1966 | Perlmutter et al. | 126/270 H |
| 3,268,719 | 8/1966 | Tackaberry | 350/202 X |
| 3,290,814 | 12/1966 | Jelinek | 350/292 X |
| 3,365,790 | 1/1968 | Brauer | 350/102 UX |
| 3,417,959 | 12/1968 | Schultz | 350/102 X |
| 3,715,152 | 2/1973 | Gunter, Jr. et al. | 350/202 |

Primary Examiner—John K. Corbin
Assistant Examiner—John D. Lee
Attorney, Agent, or Firm—Kenway & Jenney

[57] ABSTRACT

Radiant energy emitted from an opening (e.g., a door in an industrial furnace), which would otherwise be lost, is recuperated by the placement of an array of reflective cells in the path of the emitted beam. Each reflective cell comprises multiple reflecting surfaces for reflecting the incident beam back toward the opening even if the beam is not perpendicular to any of the reflecting surfaces. In a typical construction, the front face of a substrate is coated with a material (e.g., gold) that has a high reflectance in the infrared. A protective layer, which is transparent in the infrared, overlies that coating in order to prevent damage to the coating and to facilitate cleaning. Heat recuperators having dihedral and trihedral individual reflecting cells are described in detail.

9 Claims, 21 Drawing Figures

HEAT RECUPERATION

BACKGROUND OF THE INVENTION

This invention relates to the useful recovery of heat. In particular, it relates to devices and techniques effective to return radiant energy emitted from an opening either back to that opening (e.g., the open door of an industrial furnace), or directly to material being processed at high temperature.

The problem of preventing heat loss (i.e., conserving energy) in a wide variety of industrial situations has been common for many years and has recently become increasingly important as the world's energy supplies dwindle and the cost of generating heat increases. Although more, and better, insulation surrounding a unit to be maintained at an elevated temperature (e.g., an industrial furnace) may be valuable, it is not a complete answer, since, in many circumstances, there must be continuous access to the heated region (e.g., an open door to the furnace). Such openings are common, for example, where items to be treated in a heated environment are processed on a continuous, rather than a batch, basis.

While convection currents through such an opening can be inhibited in various ways, heretofore there has been no way to prevent the radiation of substantial amounts of infrared energy through the opening. Although the energy losses resulting from such radiation have been substantial, they have remained as an unsolved problem because there have been no suitable devices or techniques to deal with them.

In view of the foregoing discussion, it is a principle object of the present invention to provide devices and techniques for recuperating heat in the form of radiant energy. It is a further object to provide such devices which are relatively inexpensive to manufacture and relatively easy to install and maintain.

SUMMARY OF THE INVENTION

Briefly, in one aspect the present invention features a heat recuperator for reflecting an incident beam of radiation, the beam being incident from any direction within a large solid angle. The recuperator reflects the beam, in at least one reference plane, through an angle of substantially 180° to return it to the radiative source. The recuperator comprises a plurality of reflecting cells, each comprising a substrate which defines a plurality of planar surfaces intersecting each other in angles of approximately 90°. The substrate is coated on its surfaces facing the radiation with a material which reflects a major fraction of incident radiation in the wavelength band of about one micron to about 20 microns. That reflective coating is itself protected by a layer of material that is substantially transparent to electromagnetic radiation in that wavelength band.

Preferably, the substrate is formed either from glass sheets, molded glass, suitably formed metals, molded polymers, or a folded polymeric film. The reflecting cells can be formed by the intersection of either two or three planar reflecting surfaces to form either dihedral or trihedral reflecting cells.

In another aspect, the invention features the method of forming a molded glass item suitable for use as a substrate in a heat recuperator as described above. One method for manufacturing such a unitary, faceted glass member comprises the steps of: providing a glass mold shaped to conform to the desired faceted shape of the glass member; placing into the mold glass beads of a variety of diameters, the smallest beads having diameters at least as small as 10 microns; applying heat and pressure to the beads in the mold to cause the beads to liquify, and cooling the liquified glass to form a unitary glass member.

An alternative substrate preparation method, according to the present invention, involves the scribing and cutting of a polymeric film in a manner to define, with the scribe and cut lines, the triangular facets of a plurality of trihedral reflecting cells. The film is then folded along scribe and cut lines to provide a three dimensional substrate having faces which can serve as facets of a group of trihedral reflecting cells.

BRIEF DESCRIPTION OF THE DRAWINGS

Other objects, features, and advantages of the invention will appear from the following description of various aspects thereof, taken together with the accompanying illustrative drawings. In the drawings.

DESCRIPTION OF PREFERRED EMBODIMENTS

General

The devices to be described are essentially reflectors of infrared radiation intended for use in industrial situations (e.g., to return to a furnace heat radiated from a furnace port which must either remain open, or must be opening frequently to permit processing of items or materials into and/or out of the furnace). Given this function and environment of operation, a successful heat recuperator should have various characteristics. The more important characteristics are as follows:

1. High specular reflectance in the infrared (about 2500° F to about 1100° F source temperature). The reflectance should remain high over approximately one to one and one half octaves of wavelength to either side of the principle wavelength source, in order to provide effective reflection of the total energy from the source.

2. The reflectors should permit easy cleaning. Dust, grease, and other matter commonly found in the atmosphere of industrial plants will settle on the reflectors. It should be possible conveniently to clean the reflectors without damaging the reflecting surface.

3. The reflectors must not require exacting alignment since they are to be used in situations where exacting alignment is not practical.

4. The environment of intended usage requires that the reflectors must not be overly fragile.

5. Where corners or edges are required, these must be formed sufficiently sharply to minimize "edge losses" (further discussed below) and other associated forms of scattering. (As the scale of folds or other surface features on the reflecting surface is decreased, the significance of "edge losses" increases, because the curvature of the edge or corner is typically fixed by the material and the manufacturing process from which the reflector is made.)

6. The reflector must be designed so as to reduce, in so far as possible, the effects of radiation dispersion.

According to the present invention it has been found possible to achieve each of these characteristics by providing a heat recuperator formed as an array of reflecting units or cells, each of which presents multiple reflecting surfaces for returning an incident beam of radiation back to the source substantially independently of the angle of incidence. Each reflecting cell comprises a reflective coating deposited upon surfaces of a substrate to provide the reflecting surfaces. An overlying protective layer covers the, typically delicate, reflective coating to permit easy cleaning of the recuperator.

The way in which a heat recuperator constructed in the manner just described provides the characteristics listed above may now be described. (Specific examples, with reference to the accompanying drawings, are described in a later section.)

1. High reflectance in the infrared is achieved by proper selection of the reflective coating applied to the front surfaces (i.e., the surfaces facing the incident radiation) of the substrate. Any one of several different materials may be used. Examples include highly polished coatings of gold, copper, aluminum, or suitable multiple layer metal coatings.

It is important to prevent oxidation of the reflector surface. If a Cu reflecting surface were to oxidize, for example, its reflectance would drop by a factor of two, or more. The use of gold or aluminum is advantageous because of the resistance these materials show to oxidation. Copper is less desirable because of its susceptability to oxidation.

To obtain specular surfaces with these materials one may use the following techniques, among others:

a. Vapor deposition on glass or polymer film.
 b. Deposition from a colloidal suspension.
 c. Electrodeposition or electroforming.

2. Cleaning is facilitated by providing the easily damaged reflecting surface with some form of protective cover or coating. (In some cases the application of a protective coating or cover may also inhibit oxidation.) The material of the coating must be sufficiently transparent in the infrared so as not to interfere with the performance of the reflector. In addition, the coating must not upset the specular character of the basic reflector surface.

According to the present invention, two basic approaches for protective coatings have been identified:

a. Polymer film covers. Certain polymers are nearly transparent in the infrared (e.g., polymeric films commercially available under the names Parylene and Handiwrap). A thin film of these polymers could be stretched over the reflector to serve as a disposable dust cover. The space between the dust cover and the reflector may be filled with an inert gas (e.g., dry $N_2$), at atmospheric pressure, to protect the reflecting surface from oxidation. A small bottle of dry $N_2$, connected to the space between the dust cover and the reflecting surface by suitable conduits and valving, may be employed to replenish any nitrogen lost through leakage.

In addition, with reflector substrates formed of polymer film (discussed below), the protective polymer dust cover could be bonded directly to the substrate polymer. There is also the option of vapor depositing Al, Au or Cu directly on a "dust cover" film to provide a "back surface" reflector.

b. Oxide films deposited upon the reflecting surfaces, using vapor deposition or metallic spray techniques, may also serve as protective layers. To use this approach the most promising coating materials appear to be: $TiO_2$, $ZrO_2$, MgO, $Al_2O_3$, and various proprietary glass ceramics. For industrial furnaces (i.e., source temperatures of 2500° F to 1400° F), the thickness of the coating should be approximately 1000A in order to avoid undesirable interference effects and to have high transmission levels in the infrared.

The deposition of, say, $TiO_2$ on, say, electroformed Au, will provide a highly polished gold reflecting surface which will be nearly impervious to degradation through oxidation, because of the resistance of gold to oxidation and because of the protection of the $TiO_2$. A reflector so constructed will also tolerate cleaning and degreasing without scratching, or other forms of reflecting surface degradation, because the $TiO_2$ will serve as a hard "overcoat". Finally, provided the $TiO_2$ is smoothly deposited in a thickness of approximately 1000 A, the infrared radiation will be reflected from the specular gold surface essentially without interference.

Examples of other reflective coating—protective coating pairs are:

| Reflective Coating | Protective Coating |
| --- | --- |
| Gold | MgO |
| Gold | Al₂O₃ |
| Gold | ZrO₂ |
| Aluminum | ZrO₂ |
| Aluminized mylar | ZrO₂ |
| Copper | ZrO₂ |
| Copper coated mylar | ZrO₂ |
| Gold coated mylar | ZrO₂ |

With the "dust cover" approach, of course, a soiled dust cover may simply be replaced with a clean one. With the hard, protective, overcoating approach, however, actual cleaning of the soiled overcoat surface is required. As discussed further below, the substrates used in the heat recuperators will employ configured surfaces. One way to clean these is with an ultrasonic bath designed to accommodate the configured surfaces. Another way to clean the "hard overcoat" type reflectors is to wash them gently with a soft brush and a detergent solution.

3. Alignment. According to the present invention, multiple reflections are employed to eliminate critical alignment problems common in most optical systems. Specifically, rectangular reflectors, and variations thereof, are used to eliminate the need for precise alignment. The basic principles of these are discussed below with reference to the drawings.

4. Fragility is avoided in the heat recuperators of the present invention by an appropriate design of the substrates that define the reflecting surfaces and that are in the main structural elements of the heat recuperators. Two examples of suitable substrates, both discussed below with reference to the drawings, are an integral molded glass unit and a folded polymeric film. These, or other substrate types, can be supported in a frame or enclosure that is open only facing the direction of incident infrared radiation, thereby further protecting the substrates from breakage or other damage.

5. Edge losses are minimized by the substrate designs discussed in (4) with reference to the drawings, which produce quite sharp (i.e., a small radius of curvature) edges between adjacent reflecting surfaces, thereby minimizing edge losses.

6. Dispersion is minimized, according to the present invention, by maintaining certain orientations of the reflecting surfaces of the reflector cells.

SPECIFIC RECUPERATOR EMBODIMENTS SHOWN IN THE DRAWINGS

Figure 1:
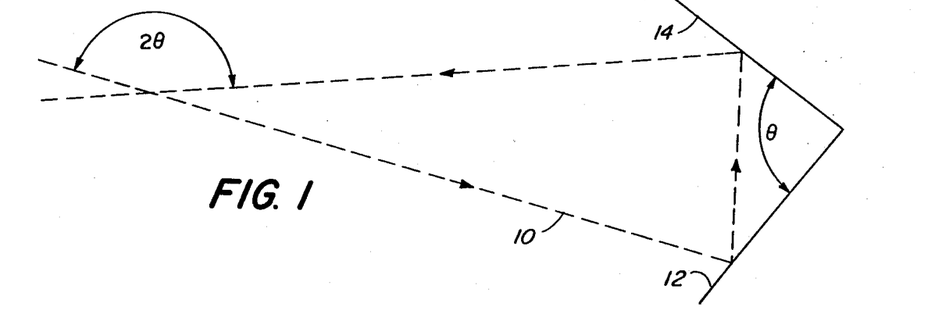
FIG. 1 is a schematic illustration of the reflection of electromagnetic radiation from a corner.

When a ray of infrared radiation (or visible light, for that matter) is reflected from a rectangular corner, the ray leaving the reflector is parallel to the incoming ray, in at least one plane. As is shown in FIG. 1, when a ray 10 is reflected from two surfaces 12, 14 which meet at an angle $\theta$, the ray will be turned through the angle $2\theta$. These principles are used in the design of the recuperative reflectors described below.

Figure 2:
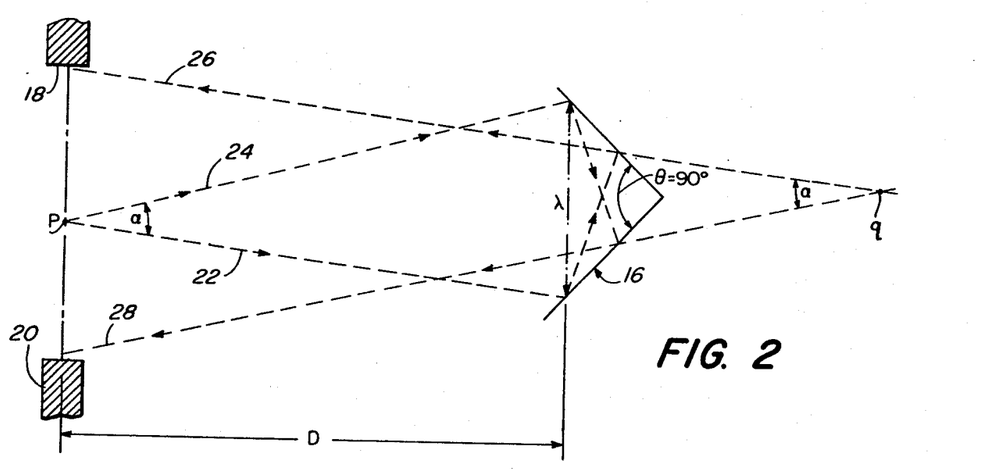
FIG. 2 is a schematic illustration of the effects of dispersion of a beam reflected at a rectangular corner.

Control of reflected radiation is important in the design of the recuperative reflectors. Consider a rectangular reflector 16 facing a radiative opening 18 in a furnace wall 20 in FIG. 2. (It should be understood that the diagram of FIG. 2 is for explanatory purposes only and that relative dimensions have been substantially altered from the most typical situations in order to simplify the explanations. In particular, referring to the aperture $\lambda$ of the reflector 16, the distance between the reflector and the opening 18 would typically be many times $\lambda$. Additionally in a typical installation, $\lambda$ would often be substantially smaller than any dimension of the opening 18.) A typical point $p$ in the opening 18 radiates a beam of radiation intercepted by the reflector. The angle of the beam is $\alpha$. The rays 22, 24 that define the beam are reflected along paths 26, 28 parallel to the original rays, as shown. The reflected beam, therefore, diverges at the angle $\alpha$, just as does the incident beam. The reflected beam, defined by rays 26, 28, thus appears to originate behind the reflector, at a point $q$. At the plane of the radiative port 18, the reflected beam can be so broad that significant portions of the reflected radiation may fall outside the radiative port 18. The performance and economics of practical heat recuperation, of course, depend upon controlling the dispersion of the reflected beam so as to return as much of the reflected radiation as possible into the radiative port.

Figure 3:
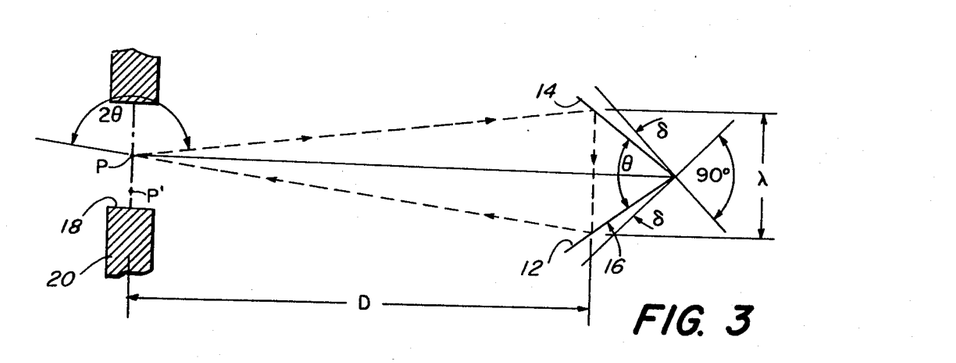
FIG. 3 is a schematic illustration of a modification of the corner reflector to counteract the effects of dispersion.

One way to control dispersion losses is through the use of reflectors with facets that intersect in an angle of less than 90°, as illustrated in FIG. 3. Through proper choice of (1) the angle, $\theta$, between the opening 18 and the surfaces 12, 14, (2) the distance, D, between the opening 18 and the recuperator, and (3) the aperture, $\lambda$, of the reflector cells, the radiation from any point $p$ on the radiative plane can be returned back to its origin, as is shown in FIG. 3. (The Figure is two dimensional, but a similar result applies to three dimensional reflectors, such as the trihedral reflectors discussed below.) Even when the reflector is not at the correct distance, D, or when the radiation comes from a point $p'$ not at the focus of the reflective cell, the spread of the reflected beam at the plane of the radiative port is small compared with the spread of a reflected beam from orthogonal facets. Thus, this reflector is very "forgiving" with respect to both focusing and control of dispersion. As will be appreciated by those skilled in the art, the focusing reflector shown in FIG. 3 has both a focal length and a hyperfocal distance. By placing the reflector 16 at its hyperfocal distance from the radiative port 18, all radiation passing through the port will be returned and focused upon the radiative plane, essentially as a point. ("Essentially" because there will, of course, never be a true point, but a "circle of confusion".)

Figure 4:
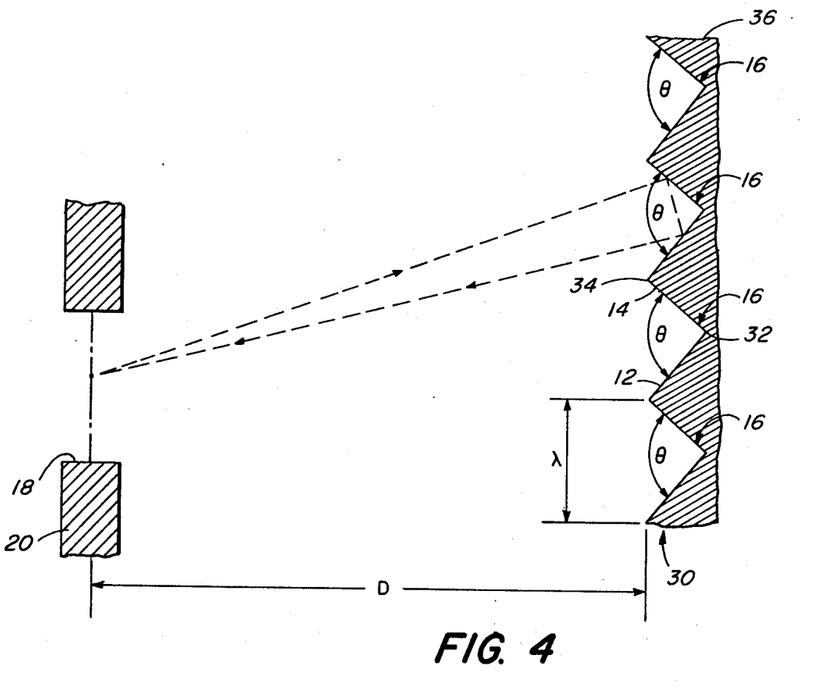
FIG. 4 is a schematic illustration of one embodiment of a heat recuperator constructed in accordance with the present invention as used to return radiant energy to an opening which is the source of the radiant beam.
Figure 5:
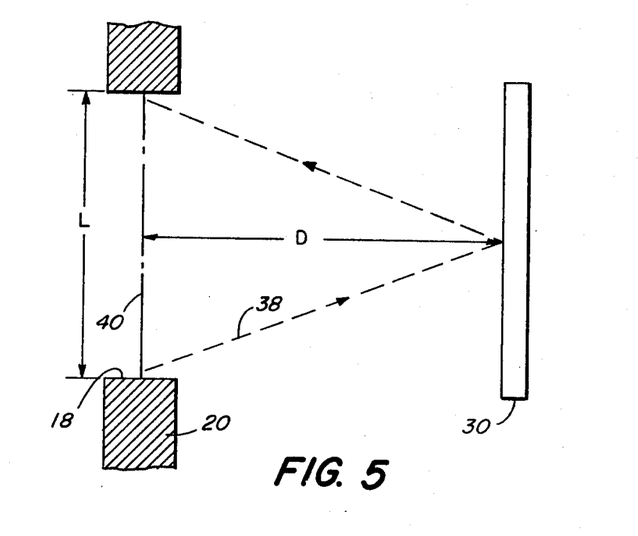
FIG. 5 is a plan view of the arrangement depicted in FIG. 4.

A specific example of the use of a non-orthogonal reflector is shown in FIGS. 4 and 5. Consider a long horizontal opening 18 (a door) in a furnace, of height 18 inches. A dihedral recuperator 30 comprising a stacked array of reflecting units 16, is placed 100 inches in front of the opening 18, with the axes of the dihedral reflecting facets running parallel to the plane of the opening. If the frontal aperture, $\lambda$, of each reflecting unit is 2 inches, then with the angle, $\theta$, between reflecting facets set at 89.42704°, a beam emanating from the horizontal centerline of the furnace, running symmetrically about the plane normal to the plane of the opening, and striking a reflecting unit which is bisected by this latter plane, will be reflected back exactly onto the line of its origin. (Again, in FIG. 5 the dimensions of the recuperator have been exaggerated, for clarity, relative to the size of opening 18 and the distance D.)

A dihedral recuperator 30 such as shown in FIG. 4 is particularly suitable for use in recuperating infrared radiation radiated from long openings (e.g., 100 inches as in the example above). In constructing such a recuperator 30, a stacked array of reflecting cells 16 is supported such that the region of the beam in front of the radiating opening 18 is substantially filled with the reflecting facets 12, 14 of the stacked reflecting cells. The reflecting facets or surfaces of each cell 16 intersect in a line of intersection 32 and adjacent reflecting units 16 abut in a line of abutment 34. As mentioned above, and as discussed in more detail below, the lines 32 and 34 should be quite sharp (i.e., a small radius of curvature) since radiation incident thereupon will be scattered to all angles and not returned uniformly to the opening 18. The reflecting surfaces 12, 14 can be provided as surfaces of an integral substrate 36 (e.g., glass), as is shown in FIG. 4 and as is discussed in greater detail below. Other possible arrangements include the provision of separate plates (e.g., glass) defining each of the facets 12, 14 and supported in a framework, and the fabrication of multiple integral dihedral cells requiring no reflective coating by extruding sheet aluminum to the appropriate sharp and then anodizing the extruded unit. Whatever arrangement is employed to provide the surfaces 12, 14, all such surfaces would be coated to provide high reflectance in the infrared, as discussed above, and then provided with a protective overlying layer to prevent degradation of the reflective coating (e.g., as by oxidation, soiling, scratching, etc.).

As is evident from FIG. 4, radiation striking the dihedral recuperator is turned through an angle of substantially 180° relative to a vertical plane (i.e., the plane of FIG. 4). FIG. 5 is a schematic illustration (again, with dimensions exaggerated) of the same arrangement of FIG. 4, but viewed from the top. Looking down at the recuperator 30, of course, the various facets of the reflecting surfaces are obscured. Seen in FIG. 5, however, is the length of the recuperator 30 and of the opening 18 (i.e., L is approximately 100 inches). As is evident in FIG. 5, any ray of radiation 38 that is emitted from the opening 18 in a plane which is not normal to the plane of the opening 18 (indicated by the reference line 40) will not be reflected through an angle of 180° in a horizontal plane. With extremely long openings 18, much of the radiation emitted in angled planes (such as ray 38 in FIG. 5) will be returned to the port 18 anyway. Additionally, in various industrial situations adjacent furnaces, or different portions of a single furnace, may be maintained at different temperatures. Radiation issuing from one furnace (or from one portion of a single furnace), may be reflected to a different furnace, a different portion of the furnace, or directly to material being processed, as a desirable feature of a dihedral recuperator.

Figure 6:
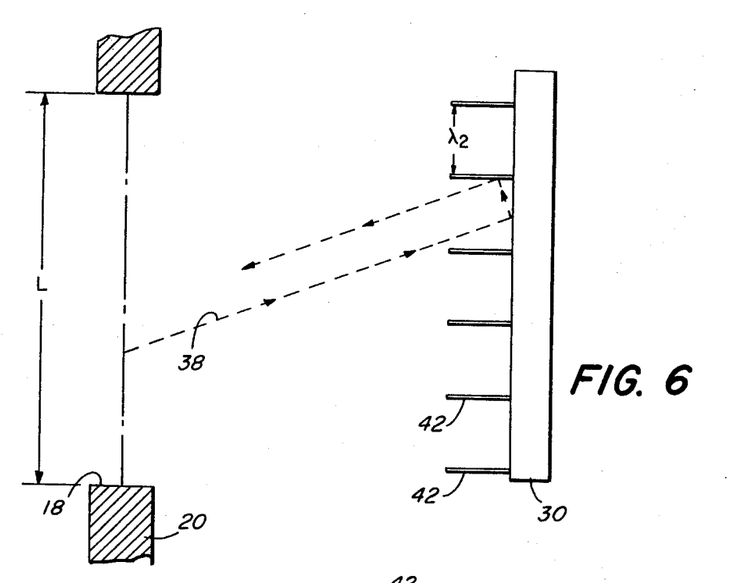
FIG. 6 is a schematic illustration, similar to FIG. 5, showing a modification of the heat recuperator in accordance with the present invention.

Usually, however, the "wandering" of radiation as illustrated in FIG. 5 is undesirable. While the wandering can be overcome by the trihedral recuperators, such as discussed below, a slight modification of the dihedral recuperator is effective substantially to eliminate the wandering. FIG. 6 is a view similar to FIG. 4 showing a dihedral reflector 30 which has been modified by the inclusion of reflecting plates 42 which project toward the opening 18 adjacent the front of the recuperator 30. Plates 42 are supported in any conventional fashion and have their surfaces coated with both a reflective and a protective coating in a manner discussed above. As is evident from FIG. 6, an obliquely radiated ray 38 will strike one of the plates 42 after its reflection from the dihedral faces of the recuperator 30 and will be turned in a horizontal plane and directed back to part of the opening 18 where it initiated. While there may be some scattering with such an arrangement, an appropriate choice of the spacing $\lambda 2$ between the reflective plates 42 can reduce scattering to a minimum for any given application of the recuperator.

Figure 7:
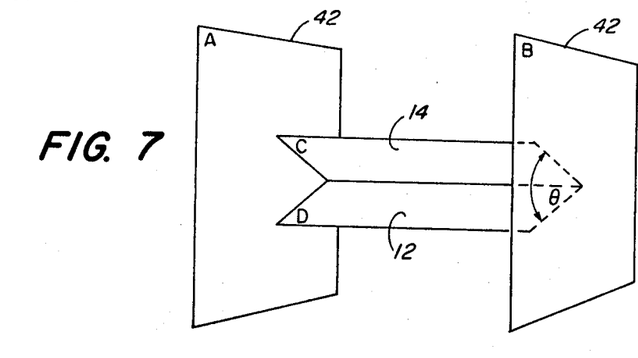
FIG. 7 is a schematic diagram illustrating the relationship of various reflecting planes in an alternative recuperator arrangement.

If the plates 42 are extended to intercept the lines of intersection 32 (see FIG. 4) between the reflective faces of dihedral recuperator 30, scattering could be substantially eliminated. The relationship between the various reflecting surfaces of a cell in such a recuperator is shown in FIG. 7 and may be termed a "quadrihedral reflector". For any given application, the increased manufacturing difficulties (and expense) of such a construction would have to be weighed against the improved properties relative to scattering.

Figure 8:
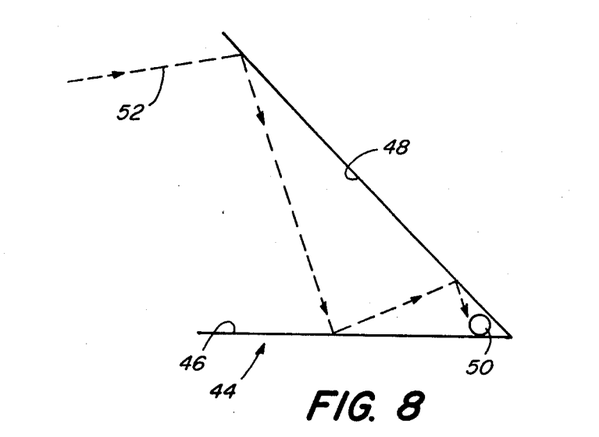
FIG. 8 is a schematic illustration of a corner reflector modified to trap radiant energy, rather than return it to its source.

The properties and functions of a dihedral reflector can be drastically altered by a change in the angle between the reflecting faces. Referring to FIG. 8, a dihedral reflector unit 44 comprises reflecting surfaces 46, 48 set at an angle of less than 45°. A pipe 50, which can contain a heat transfer medium (e.g., water) and which has a coating for selective absorption of electromagnetic radiation, is disposed longitudinally adjacent the apex of the unit 44. With the proper choice of angle between the surfaces 46, 48 and of the orientation of the unit 44 relative to an incident ray 52 of radiation, the ray will be trapped between the surfaces 46, 48 and, after multiple reflections, will strike the coating on the pipe 50. With this arrangement, of course, radiant energy can be collected and be conducted, by the pipe 50, to a different location for subsequent usage.

Figure 9:
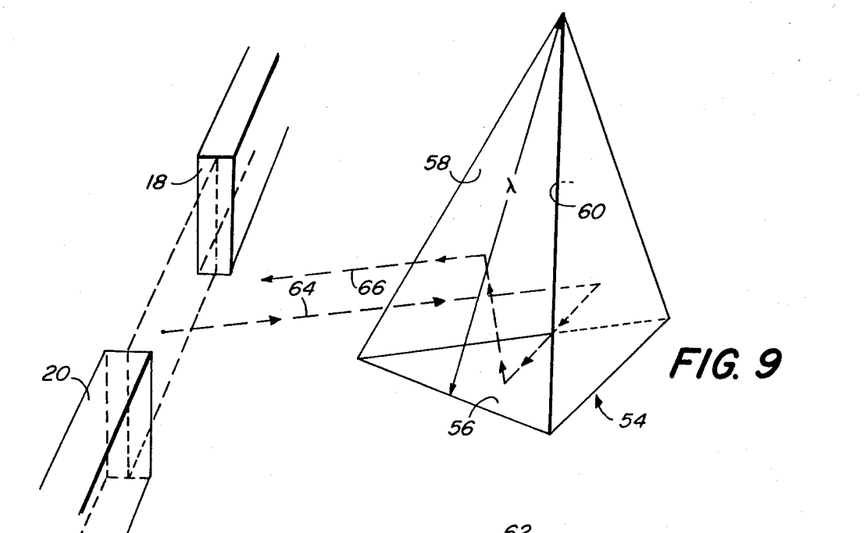
FIG. 9 is a schematic illustration of a trihedral (i.e., three faceted) corner reflector.
Figure 10:
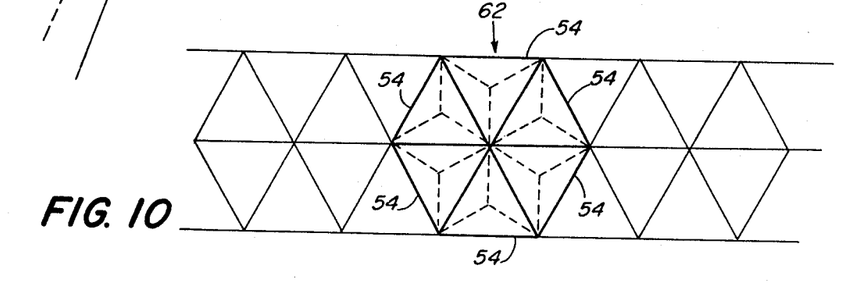
FIG. 10 is a schematic illustration of an array of trihedral reflecting cells such as that shown in FIG. 9.

Referring to FIG. 9, a trihedral reflector cell 54 may be formed by three intersection orthogonal surfaces 56, 58, 60. Viewed from the front, such a reflector looks like an equilateral triangle. Any incident ray 64 is returned, after multiple reflections in the reflector cell 54, to its source as a reflected ray 66. An array 62 of six such reflectors is hexagonal, as shown in FIG. 10. Hexagons, of course, can fill a plane and thus are a desirable shape for reflecting units. (Other shapes of course, also fill a plane. For example, the addition of two triangular cells to the hexagonal unit would result in a rhombus, which would also fill a plane and which would straight recuperator edges along two edges thereof.)

A recuperator would comprise an array of many reflector cells 54. By choosing the frontal dimension of apertures, $\lambda$, of each reflector to be sufficiently small, the radiative losses due to dispersion are confined to a band of width $\lambda$ around the boundary of the radiative port. In this band the fraction of radiant heat which is returned by an orthogonal reflector is equal to 50 percent of the total radiated heat multiplied by the reflectors' net efficiency in reflecting radiation from this band. As a concrete example consider the application of an orthogonal trihedral reflecting cell with frontal dimension, $\lambda$, of one inch. The reflector is to return radiation to an opening 18 inches high by 109 inches long. For this example, the net efficiency of reflection of any beam emanating from within the band one inch wide around the port may be taken as 75%. (This efficiency takes into account absorptive and scattering losses at the reflector, as well as losses owing to radiation which never reaches the reflector.) Of the radiation which leaves the band of one inch width around the boundary of the radiative port, the fraction which is returned is $(0.5) \times (0.75) = 0.38$. The rest, or 0.62, is lost. Over the remainder of the radiant port, the ratio of the radiation returned to the radiation emitted from any point is just equal to the net local efficiency of the reflector.

In the example above, the total area of the radiative port is 18 inches $\times$ 109 inches = 1962 in$^2$, while the total area of the port which is affected by dispersive losses of the reflected beam is $(2 \times (1 \text{ inch})) \times 109$ inches + 17 inches) = 252 in², which is 12.84% of the total area of the radiative port.

The choice of the frontal dimension, λ, of the reflector cell must be determined separately for each class of recuperator application. The cell must be sufficiently small to limit that part of the area of the radiative port, which will be affected by dispersive losses, to an appropriately small part of the whole area of the port. In addition, the frontal dimension must be maintained sufficiently large to maintain the angular tolerances and to the control of sharpness at edges and corners required in producing high efficiency reflection. For a large class of recuperator applications, λ will be between about one centimeter and about 15 centimeters.

Figure 11:
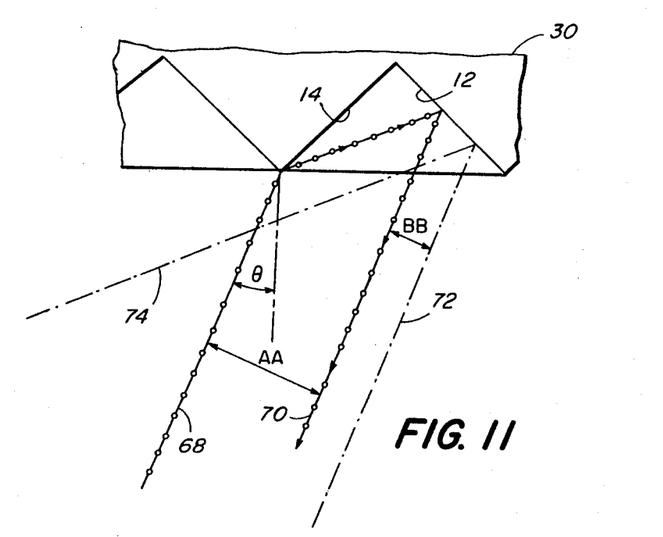
FIG. 11 is a schematic illustration of the effects of scattering at a corner reflector.

Scattering losses depend upon the angle of incidence of the radiative rays, as measured from the normal to the frontal plane of the recuperator. Even with perfectly sharp corners and edges in the reflective cells, and with no deviation in the angles between the facets of the cells, the recuperators still scatter. The mechanism of scattering is illustrated in FIG. 11, which shows, for simplicity, a dihedral reflector. (A similar analysis applies to the trihedral reflector.) An incoming ray 68 which lies in the band A—A of an incident beam will make two reflections on the cell facets and, therefore, will be reflected, as desired, to form a parallel reflected ray 70. An incoming ray 72, however, which lies in band B—B of the incident beam will make only one reflection on one facet, and will therefore be scattered, as is the associated reflected ray 74. This basic mechanism of scattering occurs in all multifaced reflectors.

For two dimensional reflectors and two dimensional collimated radiative sources (the case shown in FIG. 11), the ratio, R, of the number of radiated rays properly reflected to the total number of incident rays is related to the angle $\theta$ by $$R = \frac{\cos[2\theta]}{\cos^2\theta + \sin\theta}$$

For various angles of inclination this relationship gives:

| (degrees) | R |
|---|---|
| 0 | 1.00000 |
| 5 | 0.9122310 |
| 10 | 0.8211728 |
| 15 | 0.7266339 |
| 20 | 0.6253209 |
| 25 | 0.5167053 |
| 30 | 0.4000000 |

FABRICATION

Reflecting surfaces of the heat recuperator may be assembled or formed in any number of ways, including the preparation of a substrate for subsequent coating with a reflective material. It is necessary, however, to control both the angles between facets and the sharpness of corners or edges. To achieve the required tolerances, two fabrication techniques are believed particularly advantageous.

Figures 12, 13, 14, 15, 16, 17:
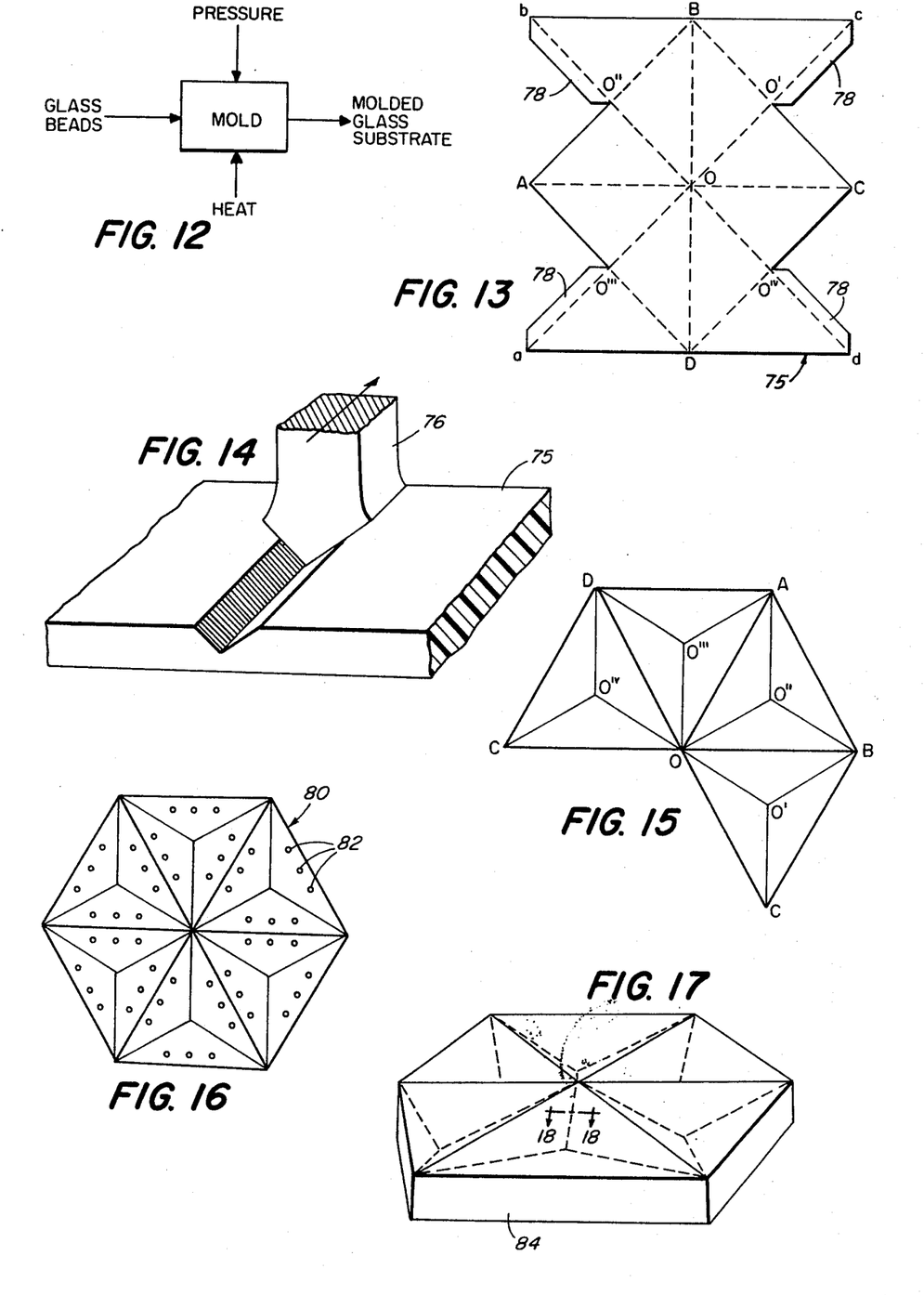
FIG. 12 is a diagram illustrating one process of manufacturing a suitable substrate for use in fabrication of heat recuperators according to the present invention.
FIGS. 13 and 14 illustrate steps in the fabrication of an alternative substrate which is formed by scribing, cutting, and folding a polymeric film.
FIG. 15 is a schematic illustration of a segment of substrate formed in accordance with the method steps illustrated in FIGS. 13 and 14.
FIG. 16 is a schematic illustration of a tool which may be used in the manufacture of substrates such as shown in FIG. 15.
FIG. 17 is a schematic illustration of a casing designed to receive and support recuperator substrates such as shown in FIG. 15.

1. Glass Shot Forming. A suitable mold cavity is filled with graded glass shot consisting of glass beads having diameters ranging down to one to ten microns. (Preferably, all beads have diameters between one and ten microns.) The distribution of sizes in the mixture is arranged to make the mixture have approximately the density of solid glass. Once this mixture of shot is poured into the mold cavity, the cavity will be filled with solid, but unbonded, glass. The radii of curvature of the glass mass at the corners and edges of the mold, which correspond respectively to edges and corners of the desired substrate, will be of the order of the diameter of the individual shot (i.e., one micron to ten microns). Now by presing down in the mold cavity with a cover, and heating the glass beads (e.g., passing an electrical current from the cover, through the glass, and to the mold body), the glass shot is melted, consolidated, and bonded together. Upon cooling, this will provide sharp-cornered and sharp-edged substrate with smooth-surfaced facets and controlled angles between the facets. (This process is schematically illustrated in FIG. 12.) The resulting substrate can be coated in various ways (e.g., vapor deposition of gold or other metal; electroforming Cu, or Ni and then Au, onto the substrate; etc.).

2. Folding. According to the present invention, both dihedral and trihedral reflectors can be formed from polymer film. In particular, a technique has been devised for forming trihedral reflectors, with exceptionally sharp edges and corners, from metallized polymer film (e.g., polyester film available under the name "Mylar"). Specifically, a rectangular sheet of film 75 is laid out in squares as shown in FIG. 13. With the metallized face turned down, the lines AO, BO, and DO are scribed, as shown in FIG. 14, with a rectangular tipped scribed 76, so that the tip of the scriber penetrates slightly more than halfway through the film. (Experimental cuttings of polymer films 0.005 inch thick show that it is possible to cut grooves, of the sort shown, approximately 0.0025 inch deep.) Next, the line CO is cut all the way through the sheet. The sheet is turned over, and all the diagonal lines such as Oc, BC, OB, AB, etc., similarly scribed. Next, the material within triangles Co'c, bo'''A, ao'''A, and do''C, is cut away, leaving behind only flaps 78. The resulting scribed and trimmed sheet may now be folded to form four trihedral reflective cells, as illustrated in FIG. 15. The accuracy of forming the angles of the reflectors and the sharpness of the edges (e.g., OD) and corners (e.g., o'''A) is controlled by the scribing of the lines given above. The flaps are used to fasten the reflector faces together.

A second sheet, the same size as the first, can be similarly scribed, except that OC is not cut through. Instead the sheet is cut through along C-o'ᵛ-O-o'''-A. The squares AbBo and OBcC are then used to form two trihedral cells, with the same cutting and use of flaps as with the first sheet. These two cells may be cemented to the four cells previously formed. (The flaps Ao'''O and Oo'ᵛC are folded over the lines OC of the first construction; these flaps are cemented to the faces co'ᵛO and Oo'C.) In this way, the final assembly is a hexagonal unit of reflector cells, such as shown in FIG. 10. All edges, including OC, are sharp folds of the polymer film. All corners are also sharp folds. The use of the flaps such as Ao'''O and Oo'ᵛC facilitates joinder of the cells and preservation of sharp edges.

Scribing can be done on a vacuum table. The hexagonal reflector units are of six cells assembled on a blank 80 (see FIG. 16) shaped to receive the individual cells. The polymer film will be held on the blank 80 during assembly by a vacuum, pulling from within the blank, through small ports 82. The assembled hexagonal reflector unit may be held on the blank and the blank used to place the assembled unit in a molded receptacle defining a frame for the heat recuperator. The overflaps (such as Ao'''O) may be used to assemble as many hexagonal units together as may be desired.

Figure 18:
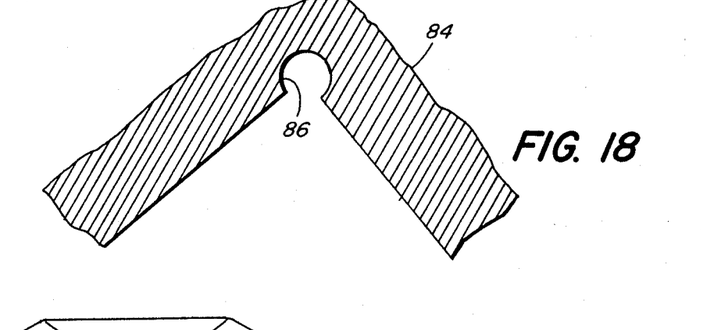
FIG. 18 is a view taken at 18—18 of FIG. 17.

The hexagonal assemblies of folded trihedral reflective cells are preferably mounted in molded cases 84 (see FIG. 17), which support the reflective material, hold the facets flat, and permit easy mounting of the reflectors. It is such cases 84 that are fitted into, and supported by, the recuperator framework. Preferably, the cases' corners are routed out, as at 86 of FIG. 18, so as not to interfere with the sharp corners of the cells.

Figure 19:
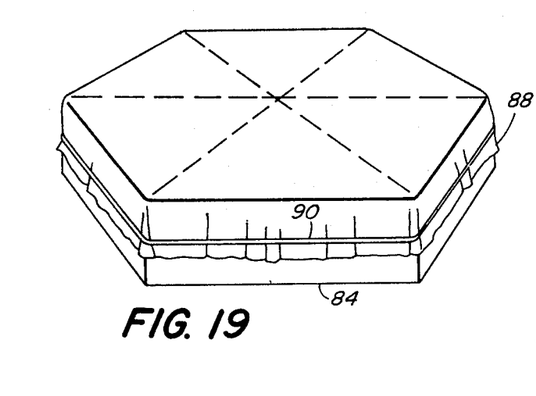
FIG. 19 is a perspective view of the assembled components of a heat recuperator segment constructed in accordance with the present invention.

Each unit formed on a case 84 may receive a dust cover 88 (see FIG. 19). As discussed above, these dust covers can be made of one of the polymer films which are transparent to infrared radiation and can be attached to the case by an elastic band 90 in a groove around the periphery of the case. As mentioned above, if the case 84 is formed from a polymer (the case being eithr integral with the polyester substrate or merely a separate support for the substrate), the dust cover 88 can be bonded directly to the case for permanent installation.

Figure 20:
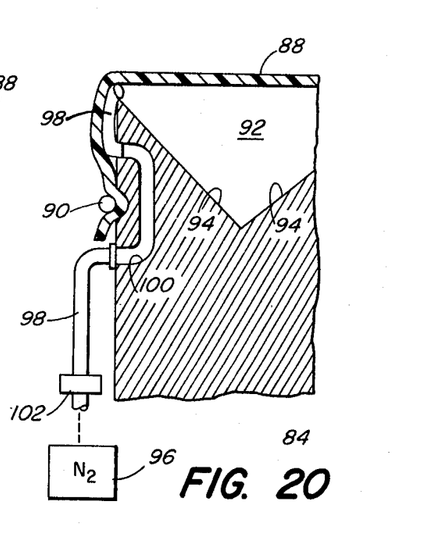
FIG. 20 is a sectional view of a modified recuperator segment such as shown in FIG. 19.

As shown in the sectional view of FIG. 20, the space 92 between the reflective surfaces 94 of the recuperator and the dust cover 88 can be filled with an inert gas (e.g., nitrogen) from a source 96 that communicates with the space 92 via tubing 98 and an internal conduit 100 provided in the base 84 to bypass the elastic band 90. Such an inert environment, of course, inhibits oxidation of the reflective surfaces 94. A conventional regulator valve 102 can be provided intermediate the source 96 and space 92 in order to maintain the space 92 at a predetermined pressure, thereby replenishing gas leakage from the space 92.

Figure 21:
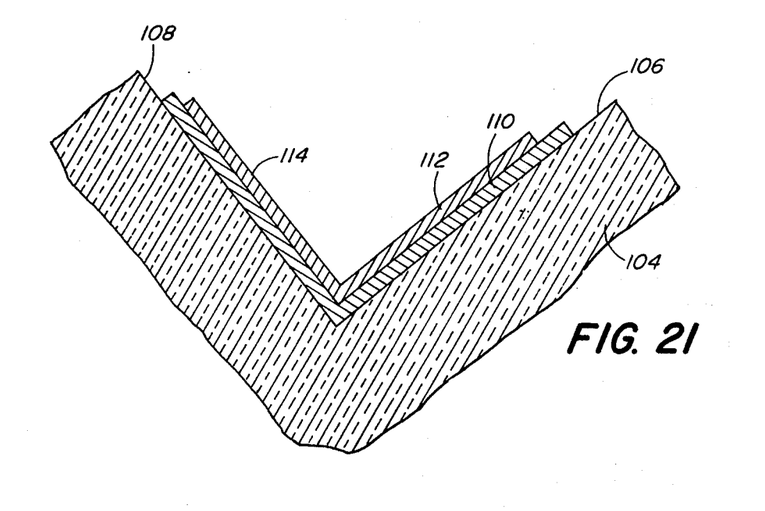
FIG. 21 is an enlarged, fragmentary, sectional view illustraing the construction of one embodiment of a reflective cell for a heat recuperator constructed in accordance with the present invention.

Oxidation, of course, can also be prevented by employing the alternative protective layer discussed above. Thus, referring to FIG. 21, a substrate 104 of glass has been molded to define intersecting surfaces 106, 108 of a reflective cell. Though surfaces have been coated with a thin layer 110 of a material which is an efficient reflector in the infrared (e.g., copper). A thin (e.g., 1000 angstroms) layer of an oxide (e.g., $ZrO_2$) 112 has been deposited over the reflective layer 110 to prevent oxidation of the layer 110, mechanical damage to the reflecting surface, and to provide an outer surface 114 which is tough enough to permit cleaning of the recuperator after it has become soiled by usage in an industrial environment.

While particular preferred embodiments of the present invention, including various fabrication techniques, have been discussed in detail herein and illustrated in the accompanying drawings, other embodiments are within the scope of the invention and the following claims.

I claim:
1. The method of recuperating radiant heat loss from a source comprising the steps of
   a. determining the solid angle into which said energy is radiated,
   b. assembling an array of abutting reflecting cells, each cell comprising a plurality of reflective surfaces disposed with respect to each other at angles of about 90°, and
   c. supporting said array within said solid angle at a distance from said source such that said array extends across a major fraction of said solid angle.

2. The method of claim 1 wherein said step (b) further includes the step of preparing reflecting cells by depositing an infrared reflecting layer on a planar substrate and then overlying that layer with a second layer of material forming a protective coating, said second layer of material being substantially transparent to infrared radiation.

3. The method of claim 2 wherein said infrared reflecting coating comprises a thin gold film.

4. The method of claim 2 wherein said step (b) further includes the step of providing glass substrate means upon which said reflective coating is deposited.

5. The method of claim 4 wherein said glass substrate means defining a plurality of said reflective surfaces are molded as an integral element.

6. The method of claim 1 wherein in said step (b) said reflective surfaces are disposed with respect to each other at angles slightly less than 90°.

7. The method of claim 1 wherein said step (b) comprises the assembling of an array of reflecting cells, each cell having two reflective surfaces.

8. The method of claim 1 wherein said step (b) comprises the assembling of an array of reflecting cells, each cell having three reflective surfaces.

9. The method of claim 1 wherein said step (b) includes the step of providing reflecting cells having an aperture size lying in the range of about ½ inch to about 6 inches.

* * * * *

UNITED STATES PATENT AND TRADEMARK OFFICE
CERTIFICATE OF CORRECTION

PATENT NO. : 4,082,414
DATED : April 4, 1978
INVENTOR(S) : Charles A. Berg

It is certified that error appears in the above-identified patent and that said Letters Patent are hereby corrected as shown below:

Column 1, line 33, change "principle" to --principal--.

Column 5, line 30, delete "in".

Column 7, line 16, change "sharp" to --shape--;

line 67, after "reduce", insert --the--.

Column 8, line 48, change "reflectors'" to --reflector's--.

Column 10, line 36, change "OB" to -- ob --.

Column 11, line 20, change "eithr" to -- either --.

Signed and Sealed this

Twenty-sixth Day of September 1978

[SEAL]

Attest:

RUTH C. MASON
*Attesting Officer*

DONALD W. BANNER
*Commissioner of Patents and Trademarks*